March 10, 1953 — J. J. CARNES — 2,630,885
BRAKE
Filed March 28, 1950 — 3 Sheets-Sheet 1

James J. Carnes
By George W. Gardes
ATTORNEYS

March 10, 1953    J. J. CARNES    2,630,885
BRAKE
Filed March 28, 1950    3 Sheets-Sheet 2

Inventor
James J. Carnes
By George W. Gardes
    Joseph N. Crouse
ATTORNEYS

Fig.10.

Patented Mar. 10, 1953

2,630,885

UNITED STATES PATENT OFFICE 2,630,885

BRAKE

James J. Carnes, Royalton, Minn.

Application March 28, 1950, Serial No. 152,437

14 Claims. (Cl. 188—78)

(Granted under Title 35, U. S. Code (1952), sec. 266)

The invention described herein may be manufactured and used by or for the Government for governmental purposes, without payment to me of any royalty thereon.

In accordance with the present invention, there are provided certain improvements in brake mechanisms, and particularly improvements in brake mechanisms that are intended for use as wheel brakes of automotive vehicles.

There are employed for this purpose many different varieties of brake mechanisms, all of which, however, are modifications of two types, one of which has the brake shoes anchored at the ends thereof, and the second of which types is a construction where the primary brake shoe is not anchored and presses against the secondary shoe.

In the first of the above types, the primary shoe is self-energizing, and does most of the braking; and when the drum revolves in the reverse direction, the secondary shoe is self-energizing and does most of the braking. While it is important to have good brakes both when the vehicle is going forward and in reverse, this type of brake is open to the disadvantage that, in view of the fact that the greater portion of use of the brakes is while the vehicle is in forward motion, the lining of the primary shoe wears out first.

In the second type of brake referred to above, the greater pressure is transferred to the secondary brake shoe and therefore the secondary lining wears out before the primary shoe lining. Also, this second type of brake is open to the disadvantage that, unless the brake shoes are in approximately exact adjustment, the brakes will lock the wheels due to both shoes rolling with the drum.

The non-uniformity of application of braking force between the brake lining and the brake drum is a universal fault in brake constructions, this resulting in uneven and excessive wearing of the brake lining at the point of maximum braking contact with the brake drum, this localized wearing requiring comparatively frequent adjustment of the brakes and also relining of the brakes, even though only the localized area of maximum contact of the brake lining has become worn to an appreciable extent.

In an effort to overcome this unequal braking contact between the brake lining and the drum, it has been proposed to employ a construction wherein the braking power is applied to the ends of the brake shoes 180° apart, the other ends of the brake shoes being anchored 180° apart. This arrangement permits the application of substantially equal braking engagement thoroughout the length of the brake lining on each shoe with the brake drum during forward movement of the vehicle, but this form of brake is found in practice to be ineffective in reverse (backward) movement of the vehicle.

This fact enables this type of brake to be employed on the front axle of the vehicle, but there is required another type of brake for the rear axle, such as a brake wherein the heel of each shoe is anchored, and braking force is applied to the toe thereof.

The brake of the present invention is designed to overcome the above-mentioned defects, by providing uniform pressure between each shoe and the drum for braking forward movement of the vehicle, while also providing efficient braking action during rearward movement of the vehicle, thereby eliminating the necessity of using different brake constructions on the front and rear axles of the vehicle, the improved brake of the present invention using all eight shoes for stopping the vehicle in forward movement and four shoes in reverse, this being due to the fact that in the present construction the secondary shoe functions effectively, no matter which may the drum rotates.

From the foregoing it will be apparent that the invention has for one of its objects the provision of an improved brake construction wherein the braking forces are distributed against the brake drum so as to obtain a substantially uniform wearing on the brake lining.

A still further object of the invention is to provide a structure wherein a cam action is applied to the heels of the brake shoes for forcing the heels of the brake shoes against the brake drums simultaneously with application of braking force at the toes of the brake shoes, thereby effecting the aforesaid substantially uniform application of the brake lining to the brake drum with substantially greater ease of application of the brake forces.

Further objects of the invention will become apparent as the description proceeds, and the features of novelty will be pointed out in particularity in the appended claims.

The invention will be understood more readily by reference to the accompanying drawings in which.

Referring more particularly to the drawings, reference character A represents a brake housing mounted in the usual manner on a housing B of an axle of a vehicle, a brake drum C being mounted in the housing A for braking the axle in the usual manner for stopping either forward or rear movement of the vehicle.

Cooperating with the brake drum C are the brake shoes 10 and 12, the brake shoe 12 being the primary brake shoe, and the brake shoe 10 being the secondary brake shoe. These brake shoes are mounted on the brake housing by a plurality of bolts 14, 16, the bolts 14 being located adjacent to the toes of the shoes, and are provided with eccentrics 17 to permit suitable adjustment of the brake shoes relative to the brake drum, while the bolts 16 are simply retaining bolts. The openings in the brake shoes for the bolts 16 are larger than the bolt studs so as to allow the shoes 10 and 12 to be retained floatingly in position, for reasons hereinafter apparent. Usual springs 15 are inserted around bolts 16 securing the shoes to housing A.

The primary actuation of the brake shoes 10 and 12 is effected through actuating means 18 and 20, which are shown as being hydraulic cylinders spaced 180° apart, although the hydraulic means may be replaced by mechanical actuating means of conventional type, as will be well understood. The brake actuating means 18 and 20 are shown as being connected to the toe portion of each brake shoe through connecting links 22 that are pivotally connected to the brake shoes as indicated at 24. These links 22 are pivotally connected to the actuating means 18, 20, as is well known. The brake actuating means 18 and 20 act to press the toe portions of the brake shoes 10, 12 against the brake drum in a radial direction thereby enabling the use of longer brake shoes and additional lengths of linings for any given drum diameter than is usual.

Positioned adjacent to the heel end of each brake shoe, and positioned 180° apart, are anchor bolts 26, 28, which are rigidly mounted in the brake housing and secured immovably by lock nuts 30 threaded on the shanks 32 of these anchor bolts. The shanks 32 of the anchor bolts pass through an enlarged opening 34 in the brake housing, being retained by a washer 36 which bears against the outside of the brake housing, and by a collar 38 which bears against the inner side of the housing A. An intermediate collar 40 seats an end of a lateral link member 42 of link 44, a washer 46 being interposed between the link member 42 and a complemental lateral link member 48 which is the other element of the link 44. The aforesaid assembly is maintained in position by a top washer 50 and a substantially U-shaped spring clip 52. Each washer 46 has oppositely disposed straight and substantially parallel portions 54 which serve as abutments for the cam ends 56, 56', of the heel flanges 57, 57' of the brake shoes 10 and 12, it being recalled that in the showing of Fig. 1, the brake shoe 12 is the primary brake shoe and the brake shoe 10 is the secondary brake shoe.

The cam ends 56, 56' of the heel flange of the brake shoes are formed at an angle so that a wedging action is obtained on the heel portion of each brake shoe responsively to application of braking pressure upon the toe webs 60, 60' of the brake shoes for stopping the forward travel of the vehicle, thereby clamping a much longer arc of the brake linings 58, 58', against the brake drum C, this wedging action of the heel webs of the brake shoes being due to the fact that during forward travel of the vehicle, the brake shoes 10, 12 become displaced or drag bodily relative to the housing C by the forward speed and momentum of the vehicle and wheels thereof on which the brakes are mounted. The aforesaid wedging action of the heel webs of the brake shoes against the anchor bolts is effected, as has been indicated above, by the application of braking forces applied to the toe portions 60, 60' of the brake shoes through actuation of the braking instrumentalities 18 and 20, which are disposed diammetrically oppositely as shown, and act radially on the toe portions of the brake shoes, the aforesaid drag of the brake shoes being one of the features of the present invention, the larger diameter of the holes for the retaining bolts enabling this displacement to occur, and the wedging action against the anchor bolts occurring responsively to deformation of the toe portions 60, 60' of the brake shoes. There results a much greater area of contact between the brake linings 58, 58' over both the toe and heel portions of the brake shoes than has been attainable heretofore. In order to assure proper contact between the cam surfaces of the flanges with the washers 46 of the anchor bolts 26, 28, the heel portions of the brake shoe webs are extended as indicated at 61, 61' so as to be continuously in contact with the washers for suitably guiding the drag of the brake shoes for assuring application of the cam ends of the brake shoe flanges against these washers 46.

It will be understood that the action of the secondary brake shoe 10 during forward travel of the vehicle is the same as that described above, the actuation of the brake shoe 10 being simultaneous with that of shoe 12 and is effected through actuation of braking means 20, which applies braking pressure between the toe portion 60' of the brake shoe 10 and the brake drum C. The drag of the brake shoe 10 is against the anchor bolt 26, the cam surface 56' of the heel of the brake shoe 10 wedging the heel portion of the brake shoe against the brake drum C as described above in connection with the action of the primary brake shoe 12. The wedging action of the heels of the brake shoes against the anchor bolts is dependent upon the angle of inclination of the cam ends of the heels of the brake shoes. The fact that both ends of the brake shoes are brought into braking action engages a much longer effective arc of the brake linings 58, 58' into braking contact with the brake drum C, than heretofore, thereby increasing the efficiency of the braking action and lessening the amount of wear on localized areas of the brake linings.

In the form of the device shown in Figs. 1 through 4, a link member 44 has been referred to above which is composed of complemental lateral members 42 and 48, and which may now be referred to in its entirety. This link member connects the anchor bolt 28 and the toe web 60' of the secondary brake shoe 10, the link member having a recessed end that fits around the shank 32 of the anchor bolt 28 and is pivotally connected to the toe web 60' by a pivot bolt connection 62. A similar link 64, composed of complemental lateral link members 66 and 68, connects the heel portion or web 57' of the secondary brake shoe 10 with the toe web 60 of the primary brake shoe 12, a connecting bolt 70 receiving the recessed end 72 of the link 64, and a bolt 74 connecting the opposite end of the link 64 to the heel web 57'' of the brake shoe 10, the bolt connections 74 and 70 pivotally connecting the link 64 to both brake shoes. The function of these links will be pointed out hereinafter. Also, oppositely disposed coil springs 76 and 78 connect the heel portion of the secondary brake shoe 10 and the toe portion of the primary brake shoe 12, and the toe portion of the secondary brake shoe 10 and the heel portion of the primary brake shoe 12, these springs 76 and 78 being normally under tension for maintaining the brake shoes 10 and 12 away from the brake drum C, so that the brake is released, these springs being operative to release the brake shoes from braking engagement responsively to release of braking pressure on the braking instrumentalities 18 and 20.

The operation of the brake during forward movement of the vehicle has been described, with the brake shoes 10 and 12 being operative for braking this forward movement of the vehicle, with the heel and toe portions of the two brake shoes making improved braking contact with the brake drum through deformation of the toe portions through braking pressure exerted by the braking means 18 and 20, and through the cam-wedging action of the heel portions of the brake shoes against the anchor bolts 26 and 28. Now, when the vehicle is in reverse movement, that is, the brake structure of Figs. 1 through 4 is rotating in counter-clockwise direction, braking pressure exerted on the brake shoes through braking instrumentalities 18 and 20 operates as follows:

When the brake structure is rotating in counter-clockwise direction, the brake shoes tend to drag in the counter-clockwise direction and the force of this drag will be transmitted from the primary brake shoe 12 through link 64 to the heel portion 57' of the secondary brake shoe 10, and also there will be a transmission of a part of the braking pressure on the toe portion 60 of the brake shoe 12 through the braking instrumentalities 18 through the link 64 to the heel portion 57' of the brake shoe 10, for clamping the heel portion of the brake shoe 10 against the brake drum C, at the same time that the braking instrumentalities 20 are applying braking pressure to the toe portion of the brake shoe 10, this braking pressure being enhanced by the pressure of the drag of the brake shoe 10 that is effected on the toe web 60' of the brake shoe 10, caused by the resultant of this pressure transmitted through link 44 against the anchor bolt 28.

From the foregoing it will be seen that in braking forward movement of the vehicle, both brake shoes 10 and 12 are effective, and the brake linings 58 and 58' are brought into braking engagement with the brake drum C through a long arc adjacent to both ends of the brake linings, producing effective braking action and much more uniformly distributed wear on the brake linings than heretofore has been attainable; and this action is coupled by the fact that, in braking rearward movement of the vehicle, which obviously does not involve the arduous service that is encountered in the forward movement of the vehicle, effective braking is attained through the secondary brake shoe, the brake lining of which is brought into braking engagement with the drum through a long arc adjacent to both ends of the brake shoe. It will be seen that the braking forces are applied at points 180 degrees apart, and act outwardly towards the brake drum in radial directions, there being facilitated the attainment of the improved results of the present improved construction by this disposition of the parts for obtaining oppositely directed, radially acting braking forces.

Similar results are obtained by the construction illustrated in Figs. 5 through 8, which differs from the modification of Figs. 1 through 4 in that the heel portions of the brake shoes bear against the shanks of the anchor bolts, thereby eliminating the washers provided in the aforesaid modification, thereby simplifying the construction of the anchor bolts; and also the pressure-transmitting links of the modification of Figs. 1 through 4, are eliminated by the modification of Figs. 5 through 8. Otherwise, the construction and operation are the same as has been described above.

Figure 9:
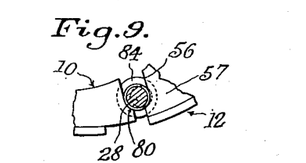
Fig. 9 is a fragmentary detailed view similar to Fig. 8, but showing a modified form of anchor bolt.

In Figs. 5 through 8, the same reference characters have been used as in Figs. 1 through 4 to indicate the similar parts. As in the case of Figs. 1 through 4, the construction of Figs. 5 through 8 includes a primary brake shoe 12 and a secondary brake shoe 10, and forward movement of the wheel is in clockwise direction. The brake shoes 10 and 12 are mounted on bolts 14 and 16, which are entirely similar to the corresponding bolts of the procedingly described modification. The bolts 14 permit adjustment of the brake shoes relative to the brake drum C as previously described. As in the previous modification, the holes for the bolts 16 through the brake shoes are substantially larger than the shanks of the bolts which mount small springs 15 between the web of the shoes and the bolt heads which cause the shoes to be pressed against housing A and permit the brake shoes 10, 12 to drag in the direction of the forward rotation (clockwise as shown in the drawings) and engage the heel portions 57, 57' of the brake shoes directly against these anchor bolts, the ends 56, 56' of the brake shoes being formed at an angle so that the brake shoes become wedged incidently to application of braking pressure through braking means 18, 20 against the toe portions 60, 60' of the brake shoes 12 and 10. It will be seen from the drawings that the secondary brake shoe 10 has its toe end recessed to fit around the anchor bolt 28. The anchor bolts 26 and 28 are held in place by washers 82, 84 on the bolt studs and by lock washer assemblies 86, and locked in place by a lock nut 88 bearing against a washer 90 and reinforcement 92 of housing A. In the form of anchor bolts shown in Figs. 6 and 7 removal thereof is accomplishable by removing nut 88 and slipping the bolts out of their respective washer assemblies in a manner which will be self-evident from the drawings. In Fig. 9 there is shown a somewhat modified form of anchor bolt wherein the bolt stud is formed somewhat eccentrically so that by the application of a suitable wrench or other suitable tool to end 87 of the stud or shank of the bolt and by exerting a turning movement thereon, an adjustment of the ends of the brake shoes adjacent to the bolts relative to the brake drum for compensating wear on the brake shoes may be effected. In the form shown in Figs. 6 and 7 such compensating adjustment is not contemplated, the end 87 in this instance forming an end stop for engagement of a tool employed for knocking the bolt loose after the nut 88 has been removed, for protection of the threads for the nut 88 against accidental damage incident to removal of the bolt. Coil springs 94, 96 interconnect the primary and secondary brake shoes as shown, and release the same from braking position responsively to release of braking pressure from braking means 18, 20.

The action is the same as in the foregoing modification. When the vehicle is moving forwardly, the brake shoes 10, 12 are dragged into engagement with the anchor bolts 26, 28. When braking pressure is applied through braking means 18, 20 to the toe portions 60, 60' of the brake shoes 10, 12, the engagement of the heel portions 57, 57' of the brake shoes with the anchor bolts causes the outwardly beveled ends 56, 56' of the brake shoes to be wedged outwardly, thereby effecting braking engagement between the brake linings 58, 58' against the brake drum C over a substantial length of each brake lining from each end thereof, thereby effecting an efficient braking action with minimized wear as compared with the usual form of brake construction. During the braking action both springs 94 and 96 are expanded, release of braking pressure enabling these springs to return to their former position or condition, thereby pulling both heel and toe portions of the brake shoes away from braking position.

Reverse movement of the vehicle (counterclockwise rotation of the structure as viewed on Figs. 5 through 8) causes the brake shoes to drag in the reverse direction, causing separation of the cam surfaces 56, 56' from their respective anchor bolts, and seating the recessed end 80 of the brake shoe 10 against the anchor bolt 28. It will be noted that the toe portion 60 of the brake shoe 12 and the flange of the brake shoe 10 are extended until they are closely adjacent, as will be apparent from Fig. 5, the portion 98 representing extension of the flange of the brake shoe 10. The brake shoe 10 is restrained against dragging by the seating of the recessed end 80 against the anchor bolt 28, so that the brake shoe 12 contacts with the flange portion 98 so that the distortion of the brake shoe 12 upon application of the braking pressure through braking means 18 is transmitted to the end 98 of the flange of the brake shoe 10, thus clamping the heel portion of brake shoe 10 against the brake drum C, thereby clamping the corresponding portion of the brake lining 58' into braking engagement with the brake drum; and simultaneously therewith the toe portions of the brake shoes 10 and 12 are distorted to clamp the corresponding portions of the brake linings 58' against the brake drum C, by action of the braking means 18 and 20.

It will be seen, therefore, that, in reverse, the braking action is effected throughout an arc of brake lining 58' which corresponds to the toe portion of the brake shoe 12, and throughout arcs of brake lining 58' that correspond to the toe and heel portions of the brake shoe 10, thereby effecting a more uniform distribution of wear than heretofore accomplishable, while effecting an efficient braking action.

In both of the illustrated embodiments of the improved construction, during forward movement of the vehicle both brake shoes in each brake construction become effective throughout the major portions of their arcs, with correspondingly increased areas of contact between the brake linings and the brake drum, thereby minimizing or entirely eliminating localized wear on the brake linings; while when the vehicle is in reverse, a prolonged arc of the brake lining corresponding to the toe portion of the primary brake shoe and increased arcs of contact between the brake lining of the secondary brake shoe corresponding to the toe and heel portions of the secondary brake shoe are effective for braking. Therefore, the same brake is effective for braking in either forward or reverse movements of the vehicle, while localized areas of wear on the brake linings are obviated, thereby materially lessening the frequency at which the brake linings require to be renewed while substantially increasing the effectiveness of the brake structure in a novel manner. It will be apparent that in both illustrated forms of the invention the brake-applying instrumentalities are oppositely disposed and radially acting; and also the anchor bolts for effecting the wedging deflection of the ends of the brake shoe are diammetrically oppositely disposed.

Figure 10:
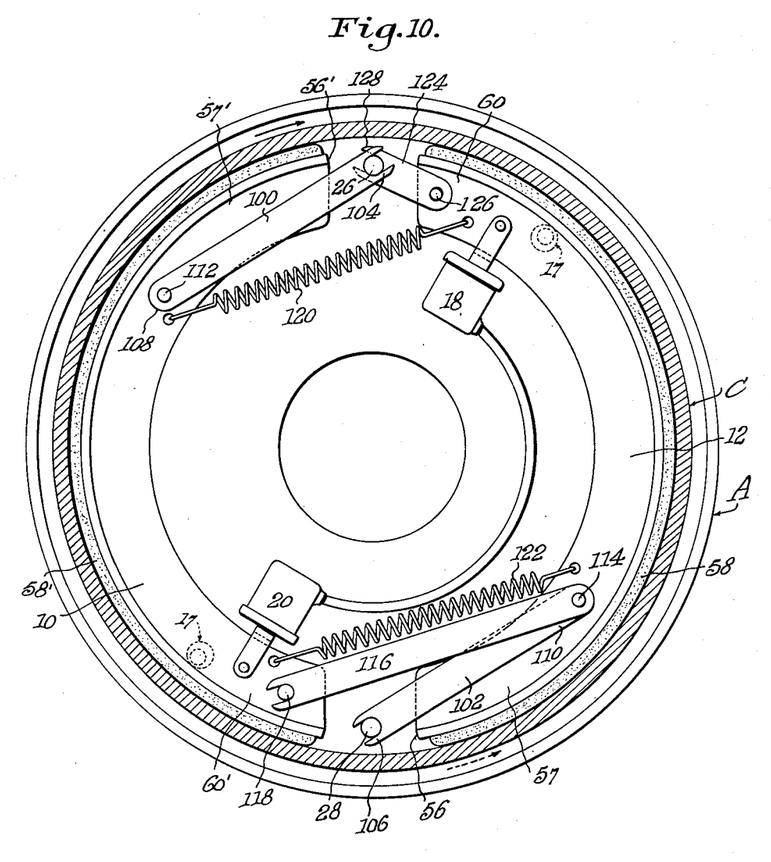
Fig. 10 is a diagrammatic view similar to Figs. 1 and 5, but showing a further modification of the construction.

There is shown in Fig. 10 a still further modified form of construction incorporating a different embodiment of braking means interconnecting the fixed anchor bolts 26 and 28 which are permanently or non-adjustably mounted, and the heel portions of the brake shoes 12 and 10, the heel ends 56, 56' terminating short of the anchor bolts, braking pressure between the anchor bolts 26 and 28 and the heel portions 57, 57' of the brake shoes being transmitted by the provision of link arms 100, 102. One end 104, 106 of the respective link arms forms a yoke that fits around the respective anchor bolts 26, 28; and the opposite ends 108, 110 of the link arms are secured to the heel portions 57, 57' through pivot pins or bolts 112, 114 that pass through the brake shoes as shown, so that when braking pressure is applied to the toe portions 60 and 60' of the brake shoes through actuation of the braking means 18 and 20, the heel portions 57, 57' of the brake shoes and the brake linings 58, 58' carried thereby, will be forced into braking engagement with the brake drum C in a manner similar to that described above, during forward movement of the vehicle when the brake drum is rotating in clockwise direction as indicated on Fig. 10, as the drag of the brake shoes 12 and 10 is exerted against the anchor bolts 28 and 26 through the links 102 and 100, respectively.

In reverse direction, when braking pressure is applied to the toe portions 60 and 60' of the brake shoes and the direction of the drag is in counterclockwise direction as viewed in Fig. 10, braking pressure is transmitted from the toe portion 60' of the secondary shoe 10 to the heel portion 57 of the primary shoe 12 through a further link 116 that is connected between a pin or bolt 118 adjacent to the toe portion 60' of the secondary brake shoe 10 and the pivot bolt 114 on the heel portion 57 of the primary brake shoe 12, this action clamping the heel portion of the brake shoe 12 and the lining 58 against the brake drum C simultaneously with braking application of the toe portion 60 of the primary brake shoe 12 and lining 58 against the brake drum C. Therefore, in forward movement of the vehicle and rotation of the brake drum in clockwise direction as viewed in Fig. 10, both brake shoes 12 and 10 are effective throughout the major portions of their length, whereas in reverse direction (counterclockwise rotation as viewed in Fig. 10), both the toe portion 60' of the secondary shoe 10 and substantially the entire length of the primary brake shoe 12 are effective for braking.

It will be apparent, therefore, that the action of the modification of Fig. 10 is exactly the same as in the embodiments of the construction described in connection with Figs. 1 and 5. The distance at which the pivot bolts 114 and 112 are located from the heel ends 56 and 56' of the respective brake shoes 12 and 10 determine the length of the arcs of the heel portions of the brake shoes that will be applied to the brake drum.

Figures 1, 2, 3, 4:
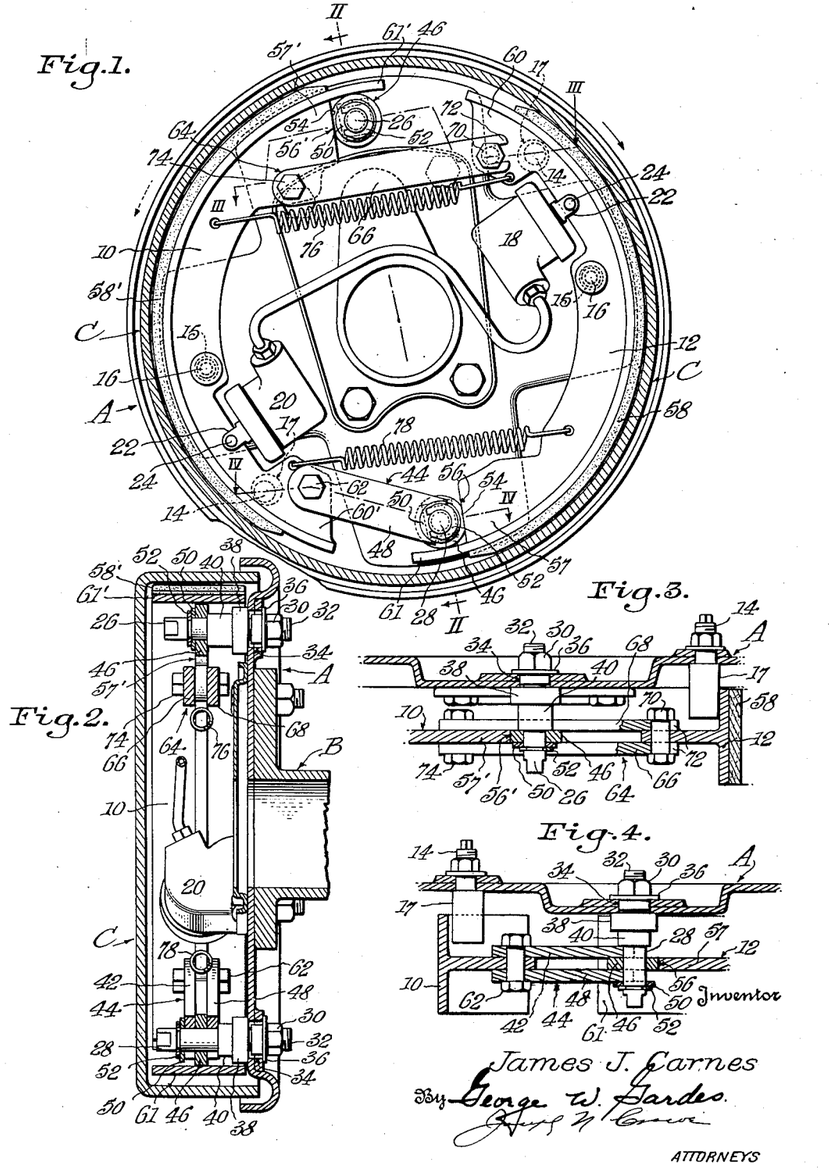
Fig. 1 is a front elevation of the improved brake construction of the present invention, the view illustrating an embodiment in which are present the features of the present invention, the cover of the brake drum housing being removed.
Fig. 2 is a transverse sectional elevation of the embodiment of Fig. 1, the view being taken on the line II—II of Fig. 1, looking in the direction of the arrows.
Fig. 3 is a fragmentary sectional elevation, taken on the line III—III of Fig. 1, looking in the direction of the arrows.
Fig. 4 is a further fragmentary sectional elevation, the view being taken on the line IV—IV of Fig. 1, looking in the direction of the arrows.
Figures 5, 6, 8:
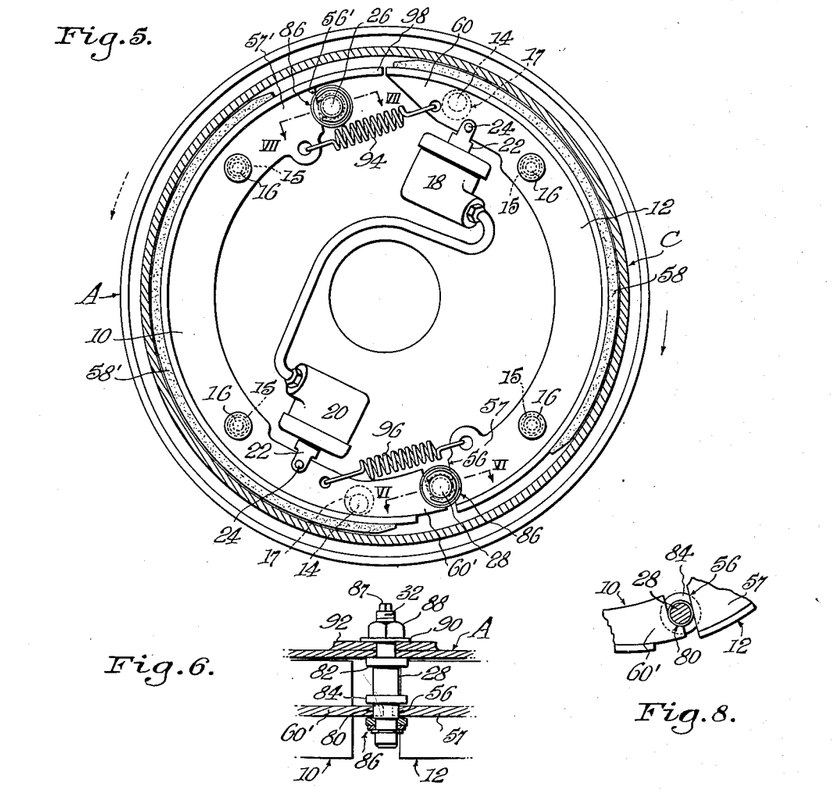
Fig. 5 is a view similar to Fig. 1, but showing a somewhat different embodiment of the invention from that shown in Fig. 1.
Fig. 6 is a fragmentary sectional elevation shown on the line VI—VI of Fig. 5, looking in the direction of the arrows.
Fig. 8 is an enlarged detail view showing details of engagement of the brake shoes of Fig. 5 with their anchor bolts.
Figure 7:
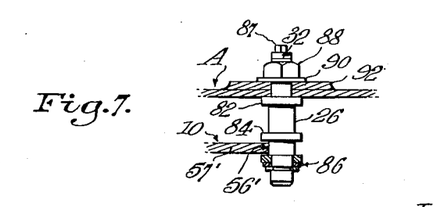
Fig. 7 is a further fragmentary elevation, the view being taken on the line VII—VII of Fig. 5, looking in the direction of the arrows.

On Fig. 10 the remaining parts of the construction that correspond to the parts shown on Figs. 1 and 5 are identified by the same reference characters as applied to these views and described above herein in connection therewith. Coil springs 120 and 122 connect the brake shoes and normally retain the brake shoes in inoperative position. These springs are diametrically oppositely disposed, and act on the brake shoes at points 180° apart.

It will be apparent from the foregoing description that in all forms of the brake, each brake shoe has maximum braking forces applied thereto at a plurality of points, namely, at both the toe and heel portions of the brake shoes, and with respect to the brake shoes, the maximum braking forces are applied in a substantially radial direction at points 180° apart, thus assuring equal application of the braking forces to the axles of the vehicle, thereby assuring even braking of the axles without tendency to distortion thereof; and in forward motion of the vehicle, both brake shoes are equally effective through the maximum portions of their length so that localized areas of wear on the brake linings are minimized. In reverse movement (rearward travel) of the vehicle the primary brake shoe 12 is effective throughout substantially the entire length, together with the toe portion of the secondary shoe 10 as will become apparent from the foregoing description.

In the modification shown in Fig. 10, a link 124 is provided to connect the toe portion of the brake shoe 12 and anchor bolt 26 for preventing dragging of the brake shoe relative to the housing A during counterclockwise rotation of the housing, the link 124 being pivotally mounted on the brake shoe 12 by a pivot bolt 126 mounted in the link 124 at one end thereof, the opposite end 128 forming a yoke fitting around the anchor bolt 26 for stopping any tendency of the brake shoe 12 to float or to drag during counterclockwise rotation of the brake housing.

The present construction is an improvement in both its illustrated embodiments over that shown in the previous United States Letters Patent No. 2,287,023 issued June 23, 1942, to James J. Carnes.

Having thus described my invention, what I claim as new and wish to secure by Letters Patent is:

1. A brake construction comprising a backing plate, a brake drum enclosing the backing plate, a primary braking shoe carried by the backing plate, a secondary braking shoe also carried by the backing plate, the said shoes being of oppositely disposed, generally arcuate shape and having a toe portion and a heel portion, the toe portion of the primary shoe being disposed oppositely to and adjacent to the heel portion of the secondary shoe, and the heel portion of the primary shoe being disposed oppositely to and adjacent to the toe portion of the secondary shoe, a brake lining mounted on each brake shoe, the said shoes being operable responsively to application of braking forces against the brake shoes for frictionally engaging the brake linings against the brake drum, oppositely disposed, radially directed brake-actuating means for the shoes, means pivotally connecting the brake-actuating means with the toe portions of the brake shoes, oppositely disposed anchor means carried by the backing plate and mounted adjacent to the heel ends of the shoes, the said ends being angularly outwardly tapering relative to the anchoring means for effecting a wedging cam action between the heel portions of the brake shoes and the brake drum for forcing the brake linings into braking engagement with the brake drum responsively to application of braking forces to the toe portions of the brake shoes, means enabling the brake shoes to drag relative to the brake drum and against the anchor means during forward rotation of the brake drum when the brake shoes are inactive, whereby radial application of braking forces to the toe portions of the brake shoes causes the heel portions of the brake shoes to be forced against the brake drum by the anchor means for applying the brake linings to the brake drum over extensive lengths thereof for obviating localized wearing of the brake linings, means interconnecting each toe portion of one of the shoes to each heel portion of the other of the shoes for returning the brake shoes and brake linings to inactive position responsively to release of the braking forces applied thereto, means effective responsively to rearward rotation of the brake drum for transmitting braking pressures from the toe portion of the primary shoe to the heel portion of the secondary shoe, and means coacting with the brake-actuating means for the secondary shoe and acting in conjunction therewith for forcing the toe portion of the secondary shoe into braking engagement with the brake drum, whereby upon forward movement of the brake the heel and toe portions of both brake shoes are effective for braking the forward movement of a vehicle on which the brake is installed, while during rearward movement of the vehicle, the toe portion of the primary brake shoe and both heel and toe portions of the secondary shoe are effective for braking the rearward movement of the vehicle.

2. A brake construction comprising a backing plate, a brake drum enclosing the backing plate, a primary braking shoe carried by the backing plate, a secondary braking shoe also carried by the backing plate, the said shoes being of oppositely disposed, generally arcuate shape and having a toe portion and a heel portion, the toe portion of the primary shoe being disposed oppositely to and adjacent to the heel portion of the secondary shoe, and the heel portion of the primary shoe being disposed oppositely to and adjacent to the toe portion of the secondary shoe, a brake lining mounted on each brake shoe, the said shoes being operable responsively to application of braking forces against the brake shoes for frictionally engaging the brake linings against the brake drum, oppositely disposed, radially directed brake-actuating means for the shoes, means pivotally connecting the brake-actuating means with the toe portions of the brake shoes, oppositely disposed anchor means carried by the backing plate and mounted adjacent to the heel ends of the shoes, the said ends being angularly and outwardly tapering relative to the anchoring means for effecting a wedging cam action between the heel portion of the brake shoes and the brake drum for forcing the brake linings into braking engagement with the brake drum responsively to application of braking forces to the toe portions of the brake shoes, means enabling the brake shoes to drag relative to the brake drum and against the anchor means during forward rotation of the brake when the brake shoes are inactive, whereby radial application of braking forces to the toe portions of the brake shoes causes the heel portions of the brake shoes to be forced against the brake drum by the anchor means for applying the brake linings to the brake drum over extensive lengths thereof for obviating localized wearing of the brake linings, means interconnecting each toe portion of one of the shoes to each heel portion of the other of the shoes for returning the brake shoes and brake linings to inactive position responsively to release of the braking forces applied thereto, link means connecting the toe portion of the primary shoe to the heel portion of the secondary shoe, the said link means becoming effective responsively to rearward rotation of the brake for transmitting braking pressures from the toe portion of the primary shoe to the heel portion of the secondary shoe, and additional link means connecting the anchor means adjacent to the tapered cam end of the primary shoe and the toe portion of the secondary shoe, whereby, upon forward movement of the brake, the heel and toe portions of both brake shoes are effective for braking the forward movement of a vehicle on which the brake is installed, while during rearward movement of the vehicle the toe portion of the pirmary brake shoe and both heel and toe portions of the secondary shoe are effective for braking the rearward movement of the vehicle, the additional link means reinforcing the braking force applied to the toe portion of the secondary shoe for braking the said rearward movement of the vehicle.

3. A brake construction comprising a backing plate, a brake drum enclosing the backing plate, a primary braking shoe carried by the backing plate, a secondary braking shoe also carried by the backing plate, the said shoes being of oppositely disposed, generally arcuate configuration and having a toe portion and a heel portion, the toe portion of one of the shoes terminating adjacent to the heel portion of the other of the said shoes, a friction brake lining mounted on each brake shoe and terminating short of the ends of each shoe, the said linings being adapted to be braked against the brake drum responsively to application of braking pressures to the brake shoes, oppositely disposed, radially acting brake-actuating means for the shoes, means pivotally connecting the oppositely disposed brake-actuating means to the toe portions of the brake shoes, oppositely disposed anchor means carried by the backing plate and positioned adjacent to the heel portions of the shoes, means for producing a relative camming wedge action between the anchor means and heel portions of the brake shoes for effecting a wedging of both heel portions of the brake shoes and the brake linings carried thereby into braking engagement with the brake drums responsively to application of oppositely directed, radially acting braking forces to the toe portions of the brake shoes for applying the brake linings to the brake drum throughout extensive lengths thereof adjacent to both the toe and heel portions of the brake shoes, thereby minimizing localized wear on the brake linings arising from braking of forward motions of a vehicle on which the brake is mounted, and means for transmitting braking pressure from the toe portion of the primary shoe to the heel portion of the secondary shoe responsively to application of radially directed braking forces to the toe portions of both shoes for effecting a braking movement of both the toe and heel portions of the secondary shoe and the toe portion of the primary shoe for braking rearward movement of the vehicle.

4. A brake construction comprising a backing plate, a brake drum enclosing the backing plate, a primary braking shoe carried by the backing plate, a secondary braking shoe also carried by the backing plate, each of the shoes having a toe portion and a heel portion, the toe portion of one of the shoes terminating adjacent to the heel portion of the other of the said shoes, a friction brake lining mounted on each brake shoe and adapted to be braked against the brake drum responsively to application of braking pressures to the brake shoes, oppositely disposed, radially acting brake-actuating means for the shoes, means pivotally connecting the oppositely disposed brake-actuating means to the toe portions of the shoes, oppositely disposed anchor means carried by the backing plate and positioned adjacent to the heel portions of the shoes, and means for producing a relative camming wedge action between the anchor means and heel portions of the brake shoes for effecting movement of both heel portions of the brake shoes and the brake linings carried thereby into braking engagement with the brake drum responsively to application of oppositely directed, radially acting braking forces to the toe portions of the brake shoes throughout extensive lengths thereof adjacent to both the toe and heel portions of the brake shoes, thereby minimizing localized wear on the brake linings arising from braking of forward motions of a vehicle on which the brake is mounted, the toe portions of the primary brake shoe contacting the heel portion of the secondary shoe during backward movement of the vehicle for effecting a braking movement of the heel portion of the secondary shoe responsive to application of braking pressures to the toe portion of both shoes, thereby braking backward motion of the vehicle with the toe portion of the primary brake shoe and both the heel and toe portions of the secondary brake shoe.

5. A brake construction comprising a backing plate, a brake drum enclosing the backing plate, a primary braking shoe carried by the backing plate, a secondary braking shoe also carried by the backing plate, each of the shoes having a toe portion and a heel portion, the heel portion of one of the shoes terminating adjacent to the toe portion of the other shoe, oppositely disposed, radially-acting brake actuating means for the shoes, a brake lining carried by the brake shoes, means connecting the brake-actuating means to the toe portion of the brake shoes, oppositely disposed anchor means rigidly carried by the backing plate and disposed adjacent to the heel portions of the brake shoes, link means interconnecting the heel portion of one of the brake shoes and the toe portion of the other shoe, means floatingly connecting the brake shoes to the backing plate for enabling longitudinal shifting of the brake shoes relative to the brake drum and backing plate in a direction corresponding to direction of rotation of the brake drum, and means coacting between the anchor bolts and the heel portions of the brake shoes for effecting a radial braking movement of the heel portions of the brake shoes and braking lining thereon through abnormally long arcs against the brake drum responsively to application of radially acting braking forces against the toe portions of the brake shoes responsively to braking application of the said oppositely disposed brake-acting means.

6. A brake construction comprising a backing plate, a brake drum enclosing the backing plate, a primary braking shoe carried by the backing plate, a secondary braking shoe also carried by the backing plate, each of the shoes having a toe portion and a heel portion, means connecting the braking shoes to the backing plate while permitting limited longitudinal bodily displacement of the braking shoes relative to the brake drum and backing plate corresponding to direction and rotation of the brake drum, oppositely disposed, radially-operating brake actuating means for the brake shoes mounted adjacent to the toe portions of the brake shoes, a brake lining carried by the brake shoes, means radially connecting the brake-actuating means to the toe portions of the brake shoes, whereby upon actuation of the brake-actuating means, the toe portions of the brake shoes and brake lining are pressed radially into braking engagement with the brake drum, the said heel portion of one of the brake shoes terminating adjacent to the toe portion of the other brake shoe, the said brake shoes extending through arcs approximately but just short of 180° in length, additional braking means mounted on the backing plate adjacent to the heel portions of the shoes and in a line passing between the heel terminus of one braking shoe and the adjacent toe terminus of the other shoe, the said additional braking means being disposed 180° apart, and means coacting between the said additional braking means and the adjacent heel portion of the braking shoes for radially forcing the heel portions of the brake shoes into braking engagement with the brake drum through arcs of substantial lengths responsively to application of radial braking forces to toe portions of the brake shoes by the first-mentioned radially operating brake-actuating means.

7. A brake construction comprising a backing plate, a brake drum enclosing the backing plate, a primary braking shoe carried by the backing plate, a secondary braking shoe also carried by the backing plate, each of the shoes having a toe portion and a heel portion, oppositely disposed, radially acting brake-actuating means connected to the toe portion of the shoes, means floatingly connecting the brake shoes to the backing plate while enabling bodily longitudinal shifting of the brake shoes relative to the brake drum and backing plate in a direction corresponding to direction of rotation of the brake drum, an anchor bolt carried by the backing plate for engagement with the end of the heel portion of each shoe, the end of the heel portion being angularly disposed relative to its anchor bolt in a direction such as to cause a cam action between the end of the heel portion of the shoe and its anchor bolt for forcing the heel portion of the brake shoes into the brake drum responsively to application of braking pressures to the toe portions of the shoe for radially forcing the toe portions into the brake drum when the brake drum is rotating in a direction from the toe of the brake shoe toward the heel portion of the brake shoe.

8. A brake construction comprising a backing plate, a brake drum enclosing the backing plate, brake shoe means carried by the backing plate, means floatingly connecting the brake shoe means to the backing plate for enabling bodily longitudinal displacement of the brake shoe means relative to the backing plate in a direction conforming to the direction of the rotation of the brake drum, anchor means for the brake shoe means carried by the backing plate for engagement with an end of the brake shoe means, the said end of the brake shoe means being adapted to press against the anchor means responsively to application of radially directed braking forces to the brake shoe means, the said end of the brake shoe means being angularly disposed relative to the anchor means in a direction adapted to impart a wedging action between the brake shoe means and the brake drum responsively to application of the braking forces to the brake shoe means when the brake drum is rotating in a direction such that the braking forces are applied toward the said end of the brake shoe means in engagement with the anchor means.

9. A brake construction comprising a backing plate, a brake drum enclosing the backing plate, brake shoe means carried by the backing plate, means floatingly connecting the brake shoe means to the backing plate for enabling bodily longitudinal displacement of the brake shoe means relative to the backing plate in a direction conforming to the direction of rotation of the brake drum, anchor means for the brake shoe means carried by the backing plate for engagement with an end of the brake shoe means, the said end of the brake shoe means being adapted to press against the anchor means responsively to application of radially directed braking forces to the brake shoe means, the said end of the brake shoe means being angularly disposed relative to the anchor means in a direction adapted to impart a wedging action between the brake shoe means and the brake drum responsively to application of the braking forces to the brake shoe means when the brake drum is rotating in a direction from application of the forces towards the said end of the brake shoe means in engagement with the anchor means, and means for adjusting the anchor means and brake shoe means relative to the brake drum for compensating for wear between the brake shoe means and the brake drum.

10. A brake construction comprising a backing plate, a brake drum enclosing the backing plate, a primary braking shoe carried by the backing plate, a secondary braking shoe also carried by the backing plate, each of the shoes having a toe portion and a heel portion, means floatingly connecting the brake shoe means to the backing plate for enabling bodily longitudinal displacement of the brake shoe means relative to the backing plate in a direction conforming to the direction of rotation of the brake drum, oppositely disposed, radially-operating brake-actuating means for the brake shoes mounted on the backing plate adjacent to the toe portions of the brake shoes, a brake lining carried by the brake shoes, means radially connecting the said brake-actuating means to the toe portions of the brake shoes, whereby upon actuation of the brake-actuating means the toe portions of the brake shoes and brake lining are pressed radially into braking engagement with the brake drum, the heel portion of one of the brake shoes terminating adjacent to the toe portion of the other brake shoe, additional braking means mounted on the backing plate intermediate the heel terminus of one of the shoes and the toe terminus of the other braking shoe, linkage means including a link arm connecting the additional braking means to the heel portions of the braking shoes for radially clamping the heel portions of the braking shoes and brake lining into braking engagement with the brake drum responsively to application of braking forces to the toe portions of the brake shoes by the first-mentioned brake-actuating means, and yieldable means normally urging the brake shoes out of braking engagement with the brake drum.

11. A brake construction comprising a backing plate, a brake drum enclosing the backing plate, a primary braking shoe carried by the backing plate, a secondary braking shoe also carried by the backing plate, each of the shoes having a toe portion and a heel portion, means floatingly connecting the brake shoe means to the backing plate for enabling bodily longitudinal displacement of the brake shoe means relative to the backing plate in a direction conforming to the direction of rotation of the brake drum, oppositely disposed radially operating brake-actuating means for the brake shoes mounted on the backing plate adjacent to the toe portions of the brake shoes, a brake lining carried by the brake shoes, means radially connecting the said brake-actuating means to the toe portions of the brake shoes whereby, upon actuation of the brake-actuating means, the toe portions of the brake shoes and brake lining are pressed radially into braking engagement with the brake drum, the heel portion of one of the brake shoes terminating adjacent to the toe portion of the other brake shoe, additional braking means mounted on the backing plate intermediate the heel terminus of one of the shoes and the toe terminus of the other shoe, linkage means connecting the additional braking means to the heel portions of the braking shoes for radially shifting the heel portions of the braking shoes and brake lining into braking engagement with the brake drum responsively to application of braking forces to the toe portions of the brake shoes by the first-mentioned brake-actuating means, and oppositely disposed spring means interconnecting the brake shoes normally holding the brake shoes away from braking engagement with the brake drum.

12. In a brake, a substantially circular brake drum, primary and secondary brake shoes adjacent to the brake drum, the shoes having toe and heel portions and an outer arcuate surface for carrying brake lining adapted to be urged into engagement with the brake drum, the shoes being arranged in heel to toe relation, means operatively connected to the shoes adjacent to their toe portions and adapted to urge the lining on the surface adjacent to the toe portions into engagement with the drum, means mounting the shoes adjacent to the drum, said mounting permitting limited planar floating movement of the shoes relative to the drum, a first cam means positioned adjacent to the heel of each shoe, the heel of each shoe having a second cam means adapted to engage the first cam means for urging the shoe heel toward the drum when the shoe is urged toward the first cam means, a first link pivotally connected to the toe of the secondary shoe and to a post adjacent to the heel of the primary shoe, a second link pivotally connected to the toe of the primary shoe and to the heel of the secondary shoe, and means urging the shoes toward each other and out of engagement with the drum, whereby during rotation of the drum in one direction and engagement of the toe portions therewith the shoes will be urged through frictional engagement with the rotating drum toward the first cam means, the second cam means engaging said first cam means and urging the shoe heels toward the drum, the first link limiting movement of the secondary shoe in the other direction, the toe of the primary shoe acting through the second link during such movement of the drum in the other direction urging the heel of the secondary shoe into engagement with the drum.

13. In a brake, a substantially circular rotatably mounted brake drum, primary and secondary brake shoes adjacent to the brake drum, the shoes having toe and heel portions and an outer arcuate surface for carrying lining adapted to be urged into engagement with the brake drum, the shoes being arranged in heel to toe relation, means operatively connected to the shoes adjacent to their toe portions and adapted to urge the lining on the surface adjacent to the toe portions into engagement with the drum, means mounting the shoes adjacent to the drum, said mounting means permitting limited planar floating movement of the shoes relative to the drum, a first cam means positioned adjacent to the heel portion of each shoe, the heel portion of each shoe having a second cam means adapted to engage the first cam means and urge the heel portion toward the drum when the shoe is urged toward the first cam means, whereby during rotation of the drum in one direction and engagement of the toe portions therewith, the shoes will be urged through frictional engagement with the rotating drum toward the first cam means, the second cam means engaging said first cam means and urging their associated heel portions into engagement with the drum, stop means adjacent to the toe portion of the secondary shoe for limiting movement of the secondary shoe in the other direction, the toe portion of the primary shoe acting on the heel portion of the secondary shoe during such movement of the drum in the other direction to urge the heel portion of the secondary shoe into engagement with the drum.

14. In a brake, a rotatably mounted brake drum, primary and secondary brake shoes adjacent to the brake drum, the shoes having toe and heel portions and an outer surface for carrying brake lining adapted to be urged into engagement with the brake drum, the shoes being arranged in heel to toe relation, means operatively connected to the shoes adjacent to their toe portions and adapted to urge the lining on the surface adjacent to the toe portions into engagement with the drum, a first cam means positioned adjacent to the heel portion of each shoe, the heel portion of each shoe having a second cam means adapted to engage the first cam means and urge the heel portion toward the drum when the shoe is urged toward the first cam means, whereby during rotation of the drum in one direction and engagement of the toe portions therewith the shoes will be urged through frictional engagement with the rotating drum toward the first cam means, the second cam means engaging said first cam means and urging their associated heel portions into engagement with the drum, stop means adjacent to the toe portion of the secondary shoe for limiting movement of the secondary shoe in the other direction, the toe portion of the primary shoe acting on the heel portion of the secondary shoe during such movement of the drum in the other direction to urge the heel portion of the secondary shoe into engagement mith the drum.

JAMES J. CARNES.

REFERENCES CITED

The following references are of record in the file of this patent:

UNITED STATES PATENTS

| Number | Name | Date |
|---|---|---|
| 1,426,450 | Baker | Aug. 22, 1922 |
| 1,660,176 | Rayburn | Feb. 21, 1928 |
| 1,718,526 | Christensen | June 25, 1929 |
| 1,727,717 | Kelley | Sept. 10, 1929 |
| 1,976,419 | Taylor | Oct. 9, 1934 |
| 2,451,325 | Eksergian et al. | Oct. 12, 1948 |
| 2,502,152 | Hudson | Mar. 28, 1950 |
| 2,506,084 | House | May 2, 1950 |

FOREIGN PATENTS

| Number | Country | Date |
|---|---|---|
| 63,413 | Sweden | Apr. 28, 1925 |